US012801435B2

(12) United States Patent
Choi et al.

(10) Patent No.: US 12,801,435 B2
(45) Date of Patent: Nov. 17, 2026

(54) SYSTEM AND METHOD FOR SETTING OPTIMAL SYNCHRONIZATION AGENT BY WORKLOAD

(71) Applicant: Korea Electronics Technology Institute, Seongnam-si (KR)

(72) Inventors: Won Gi Choi, Seoul (KR); Sang Shin Lee, Yongin-si (KR); Min Hwan Song, Yongin-si (KR); Jee Hyeong Kim, Seongnam-si (KR)

(73) Assignee: Korea Electronics Technology Institute, Seongnam-si (KR)

( * ) Notice: Subject to any disclaimer, the term of this patent is extended or adjusted under 35 U.S.C. 154(b) by 481 days.

(21) Appl. No.: 18/380,960

(22) Filed: Oct. 17, 2023

(65) Prior Publication Data

US 2024/0134690 A1 Apr. 25, 2024
US 2024/0231907 A9 Jul. 11, 2024

(30) Foreign Application Priority Data

Oct. 19, 2022 (KR) ........................ 10-2022-0134533

(51) Int. Cl.
*G06F 9/50* (2006.01)

(52) U.S. Cl.
CPC .................................. *G06F 9/5005* (2013.01)

(58) Field of Classification Search
CPC ........................... G06F 9/5005; H04L 67/1095
USPC ......................................................... 718/104
See application file for complete search history.

(56) References Cited

U.S. PATENT DOCUMENTS

2007/0220489 A1* 9/2007 Kashiwagi .......... G06F 11/3476 717/124
2008/0198036 A1* 8/2008 Songkakul ............. G05B 15/02 340/4.32
2009/0204232 A1* 8/2009 Guru ...................... G06Q 10/08 700/12
2009/0240193 A1* 9/2009 Mensinger ........... A61B 5/0022 702/19
2011/0093854 A1* 4/2011 Blanc .................... G06F 9/5066 718/101
2011/0179176 A1* 7/2011 Ravichandran ........ G06Q 10/06 709/226

(Continued)

FOREIGN PATENT DOCUMENTS

JP 2010-33131 A 2/2010
WO WO 2006/046486 A1 5/2006

OTHER PUBLICATIONS

Korean Office Action issued on Jul. 31, 2023 in corresponding Korean Patent Application No. 10-2022-0134533 (4 pages in English, 5 pages in Korean).

*Primary Examiner* — Tuan C Dao
(74) *Attorney, Agent, or Firm* — NSIP Law

(57) ABSTRACT

There are provided a system and a method for setting a synchronization agent. A system for setting an optimal synchronization agent according to a workload according to an embodiment includes: a data integration device configured to integrate and store data which is collected through a collection agent; an agent management server configured to manage the collection agent that periodically polls data from a data source and transmits the data to the data integration device; and an agent setting automation device configured to set an optimal agent set value related to collection and transmission of data of the collection agent.

17 Claims, 4 Drawing Sheets

(56) References Cited

U.S. PATENT DOCUMENTS

| | | | | |
|---|---|---|---|---|
| 2012/0022910 | A1* | 1/2012 | Chi | G06F 16/2453 706/46 |
| 2013/0060555 | A1* | 3/2013 | Thomson | G06F 1/3287 712/30 |
| 2015/0168964 | A1* | 6/2015 | Wu | G05D 23/1917 700/276 |
| 2016/0058390 | A1* | 3/2016 | Dyell | G06Q 10/10 340/870.07 |
| 2016/0198996 | A1* | 7/2016 | Dullen | A61B 5/02055 600/595 |
| 2017/0124758 | A1* | 5/2017 | Jia | B64G 1/242 |
| 2019/0174207 | A1* | 6/2019 | Cella | H04L 67/12 |
| 2019/0217739 | A1* | 7/2019 | Sinha | B60L 53/62 |
| 2019/0303223 | A1* | 10/2019 | Frolikov | G06F 13/1626 |
| 2020/0104609 | A1* | 4/2020 | Clothier | G06V 20/17 |
| 2020/0272913 | A1* | 8/2020 | Yu | G06N 3/08 |
| 2021/0107539 | A1* | 4/2021 | Howard | G06F 18/241 |
| 2021/0236020 | A1* | 8/2021 | Matijevich | A61B 5/1038 |
| 2022/0103618 | A1* | 3/2022 | Pinheiro | H04L 67/60 |
| 2023/0303052 | A1* | 9/2023 | Gesang | B60W 30/18 |

* cited by examiner

SYSTEM AND METHOD FOR SETTING OPTIMAL SYNCHRONIZATION AGENT BY WORKLOAD

CROSS-REFERENCE TO RELATED APPLICATION(S) AND CLAIM OF PRIORITY

This application is based on and claims priority under 35 U.S.C. § 119 to Korean Patent Application No. 10-2022-0134533, filed on Oct. 19, 2022, in the Korean Intellectual Property Office, the disclosure of which is herein incorporated by reference in its entirety.

BACKGROUND

Field

The disclosure relates to a system and a method for setting a synchronization agent, and more particularly, to a system and a method for setting an optimal synchronization agent according to a workload, which set an agent set value in order to maximize performance of a collection agent that is in charge of data collection in a data integration device, which collects, stores, and associates data generated in various systems, such as a database system, an Internet of Things (IoT) platform, a file, etc., in real time.

Description of Related Art

In a related-art data integration device which collects, stores, and associates data generated in various system in real time, a collection agent which is in charge of data collection may be generally set based on default set values since it is difficult to consider all data characteristics of connected systems. To this end, there is a problem that an execution agent is not efficiently used.

A skilled system manager may execute an agent with reference to a value that is determined and set by utilizing his/her experience. However, a system environment, a data reception speed, a data size, etc. may have many continuous values, and accordingly, when an optimal value is selected by using experiences of a skilled system manager, much time may be required to set a collection agent.

SUMMARY

The disclosure has been developed in order to solve the above-described problems, and an object of the disclosure is to provide a system and a method for setting an optimal synchronization agent according to a workload, which can automatically set an optimal value for a setting parameter related to collection, transmission of data of an agent so as to maximize performance of an agent that is in charge of data collection in a data integration device, which collects, stores, and associates data generated in various systems, such as a database system, an IoT platform, a file, etc., in real time.

According to an embodiment of the disclosure to achieve the above-described object, a system for setting an optimal synchronization agent according to a workload may include: a data integration device configured to integrate and store data which is collected through a collection agent; an agent management server configured to manage the collection agent that periodically polls data from a data source and transmits the data to the data integration device; and an agent setting automation device configured to set an optimal agent set value related to collection and transmission of data of the collection agent.

The agent setting automation device may include: a user interface unit; a storage unit configured to store history data regarding performance of the collection agent; a performance prediction module configured to predict a performance index of the data integration device; and a set value recommendation module configured to recommend an agent set value based on a result of predicting the index performance.

The storage unit may store a data loading speed of a previously registered data source, information on a data size, a current status of resources of a CPU and a memory of the agent management server, a set value of the collection agent, and a performance result value of the data integration device which is derived in a corresponding environment.

The performance prediction module may periodically collect data from the storage unit from a time when the agent setting automation device is driven, and may train an association relationship functional formula that is related to a performance index of the data integration device, information of a data source, the current status of resources of the CPU and the memory of the agent management server, and the set value of the collection agent.

The agent set value may include a set value regarding a polling period, a size of a buffer memory, an arrangement size, a type of a compression algorithm, and a data waiting time.

The performance prediction module may generate a plurality of certain set values for a collection agent to be generated when there is no data source that is previously registered, and may perform sampling.

When the plurality of certain set values are generated, the performance prediction module may predict the performance index of the data integration device by applying the generated plurality of certain set values to the trained association relationship functional formula, and in this case, the set value recommendation module may recommend a set value that maximizes the performance index as a set value of a new collection agent to be generated.

The user interface may perform an operation of generating/referring/deleting a collection agent, and may generate a collection agent based on a set value that is recommended by the set value recommendation module.

The performance index of the data integration device may be a data throughput of the data integration device.

According to another embodiment of the disclosure, a method for setting an optimal synchronization agent according to a workload may include: setting, by an agent setting automation device, an optimal agent set value related to collection and transmission of data of a collection agent; periodically polling, by a collection agent, data from a data source according to the set agent set value, and transmitting the data to a data integration device; and integrating, by the data integration device, data collected through the collection agent, and storing the data.

According to still another embodiment of the disclosure, a system for setting an optimal synchronization agent according to a workload may include: a data integration device configured to integrate and store data which is collected through a collection agent, the collection agent configured to periodically poll data from a data source and transmit the data to the data integration device; and an agent setting automation device configured to predict a performance index of the data integration device, to recommend an agent set value related to the performance index based on a result of predicting the performance index, and to set an optimal agent set value.

According to yet another embodiment of the disclosure, a method for setting an optimal synchronization agent according to a workload may include: predicting, by an agent setting automation device, a performance index of a data integration device; recommending, by the agent setting automation device, an agent set value related to the performance index based on a result of predicting the performance index, and setting an optimal agent set value; periodically polling, by a collection agent, data from a data source according to the set agent set value and transmitting the data to the data integration device; and integrating and storing, by the data integration device, data which is collected through the collection agent.

According to embodiments of the disclosure as described above, in a data integration device which collects, stores, and associates data generated in various systems, such as a database system, an IoT platform, a file, etc., in real time, performance of an agent that is in charge of data collection may be maximized.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Hereinafter, the disclosure will be described in more detail with reference to the accompanying drawings.

Figure 1:
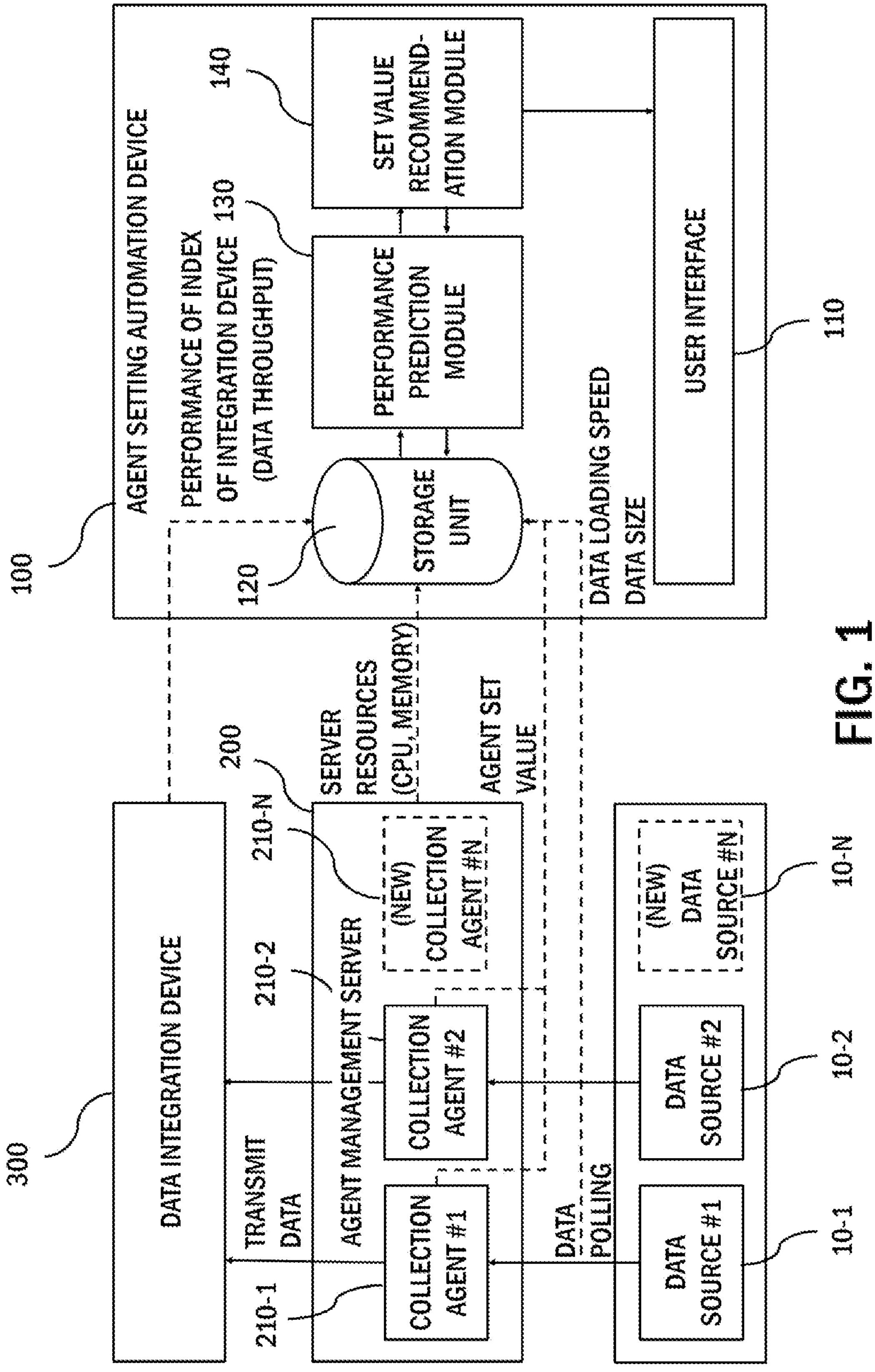
FIG. 1 is a view provided to explain a system for setting an optimal synchronization agent according to a workload according to an embodiment.

FIG. 1 is a view provided to explain a system for setting an optimal synchronization agent according to a workload according to an embodiment.

Referring to FIG. 1, a system for setting an optimal synchronization agent according to a workload (hereinafter, referred to as a 'system') according to an embodiment may include an agent setting automation device 100, an agent management server 200, and a data integration device 300.

The agent setting automation device 100 is provided to set an agent set value related to collection and transmission of data of one or more collection agents 210-1 to 210-N as an optimal value.

Specifically, the agent setting automation device 100 may optimize data loading performance of the data integration device 300 by analyzing an environment of various data sources 10-1 to 10-N and an operating environment of one or more collection agents 210-1 to 210-N which collect data, and by automatically setting an optimal value for a setting parameter related to collection and transmission of data of the collection agents 210-1 to 210-N.

To achieve this, the agent setting automation device 100 may include a user interface unit 110, a storage unit 120, a performance prediction module 130, and a set value recommendation module.

The user interface unit 110 may perform operations of generating/referring/deleting collection agents 210-1 to 210-N, and, in generating collection agents 210-1 to 210-N, may generate the collection agents 210-1 to 210-N based on a set value recommended by the set value recommendation module.

The storage unit 120 may store history data regarding performance of the collection agents 210-1 to 210-N.

Specifically, the storage unit 120 may store a data loading speed of the already registered data sources 10-1 to 10-N, information on a data size, a current status of a CPU and a memory resource of the agent management server 200, a set value of the collection agents 210-1 to 210-N, and a performance result value of the data integration device 300 derived in a corresponding environment.

The performance prediction module 130 may predict a performance index of the data integration device 300.

Specifically, the performance prediction module 130 may periodically collect data from the storage unit 120 starting from a time when the agent setting automation device 100 is driven, may train an association relationship functional formula regarding a performance index of the data integration device 300, information on the data sources 10-1 to 10-N, a current status of resources of a CPU and a memory of the agent management server 200, and a set value of the collection agents 210-1 to 210-N, and may predict a performance index of the data integration device 300 by using the trained association relationship functional formula.

The set value recommendation module may recommend an agent set value based on the result of predicting the performance index.

Herein, the agent set value may include a set value regarding a polling period, a buffer memory size, an arrangement size, a type of a compression algorithm, and a data waiting time.

The agent management server 200 may manage one or more collection agents 210-1 to 210-N which periodically poll data from the one or more data sources 10-1 to 10-N, and transmit the data to the data integration device 300.

The data integration device 300 may integrate and store data that is collected through the one or more collection agents 210-1 to 210-N.

Figure 2:
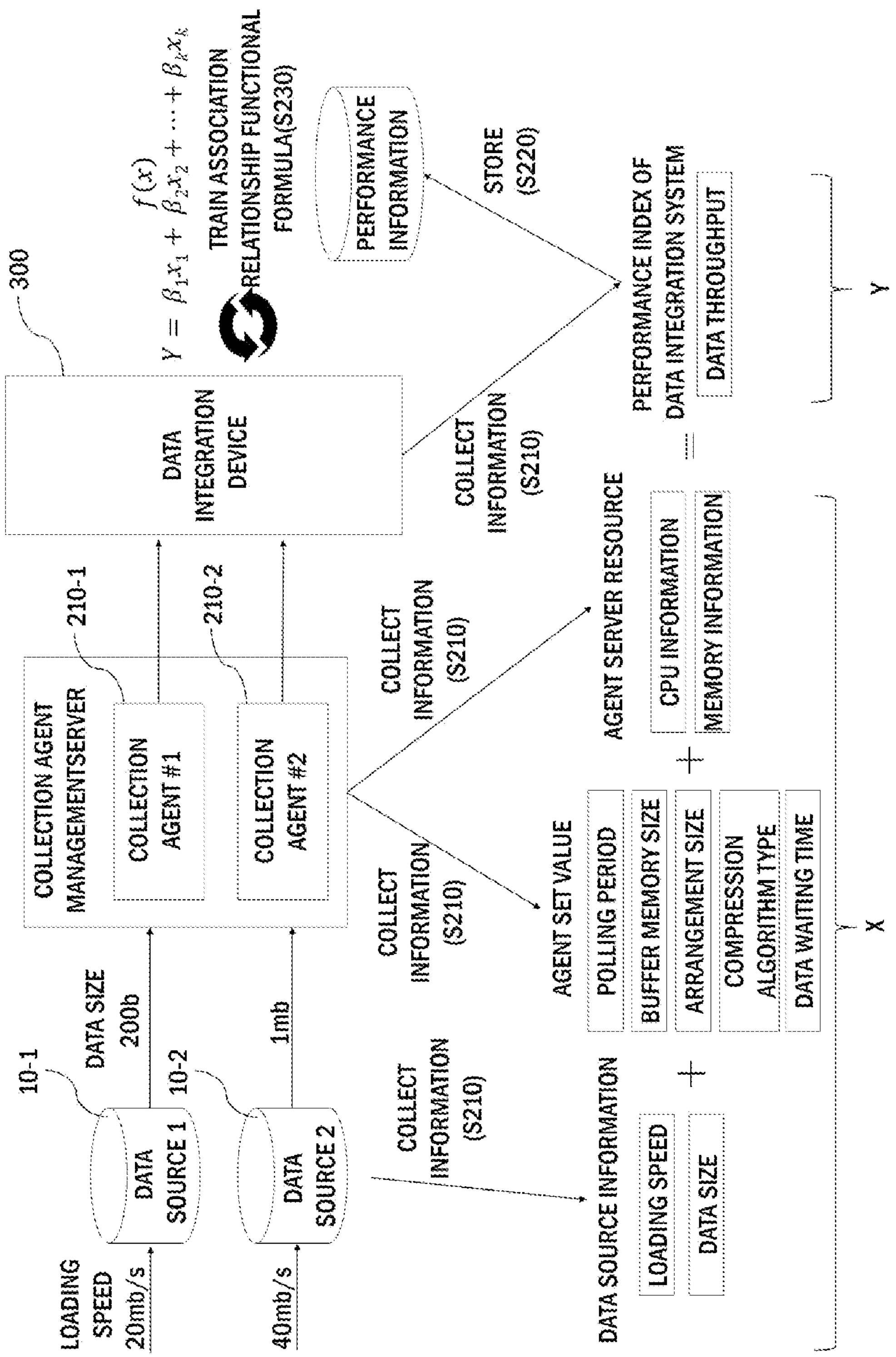
FIG. 2 is a view provided to explain a process of training an association relationship functional formula which is used for predicting a performance index of a data integration device through the system for setting an optimal synchronization agent according to a workload according to an embodiment.

FIG. 2 is a view provided to explain a process of training the association relationship functional formula which is used for predicting a performance index of the data integration device 300 through the system for setting an optimal synchronization agent according to a workload according to an embodiment.

Referring to FIG. 2, the performance prediction module 130 may periodically collect data from the storage unit 120 from a time when the agent setting automation device 100 is driven (S210), and may store information of the data sources 10-1 to 10-N, a current status of resources of the agent management server 200, a set value of an agent, which correspond to input information of the association relationship function formula, and a performance index (data throughput, etc.) of the data integration device 300 which corresponds to output information of the association relationship functional formula (S220).

In addition, the performance prediction module 130 may train the association relationship functional formula by using information corresponding to the input information of the association relationship functional formula and the output information of the association relationship functional formula (S230).

Through this, the performance prediction module 130 may predict a performance index of the data integration device 300 by using the trained association relationship functional formula.

Herein, the information of the data sources 10-1 to 10-N may include information on a data loading speed and a data size, and the agent set value may include a set value regarding a polling period, a size of a buffer memory, an arrangement size, a type of a compression algorithm, and a data waiting time.

In addition, the resource information of the agent management server 200 may include information on resources of a CPU and a memory of the agent management server 200.

Figure 3:
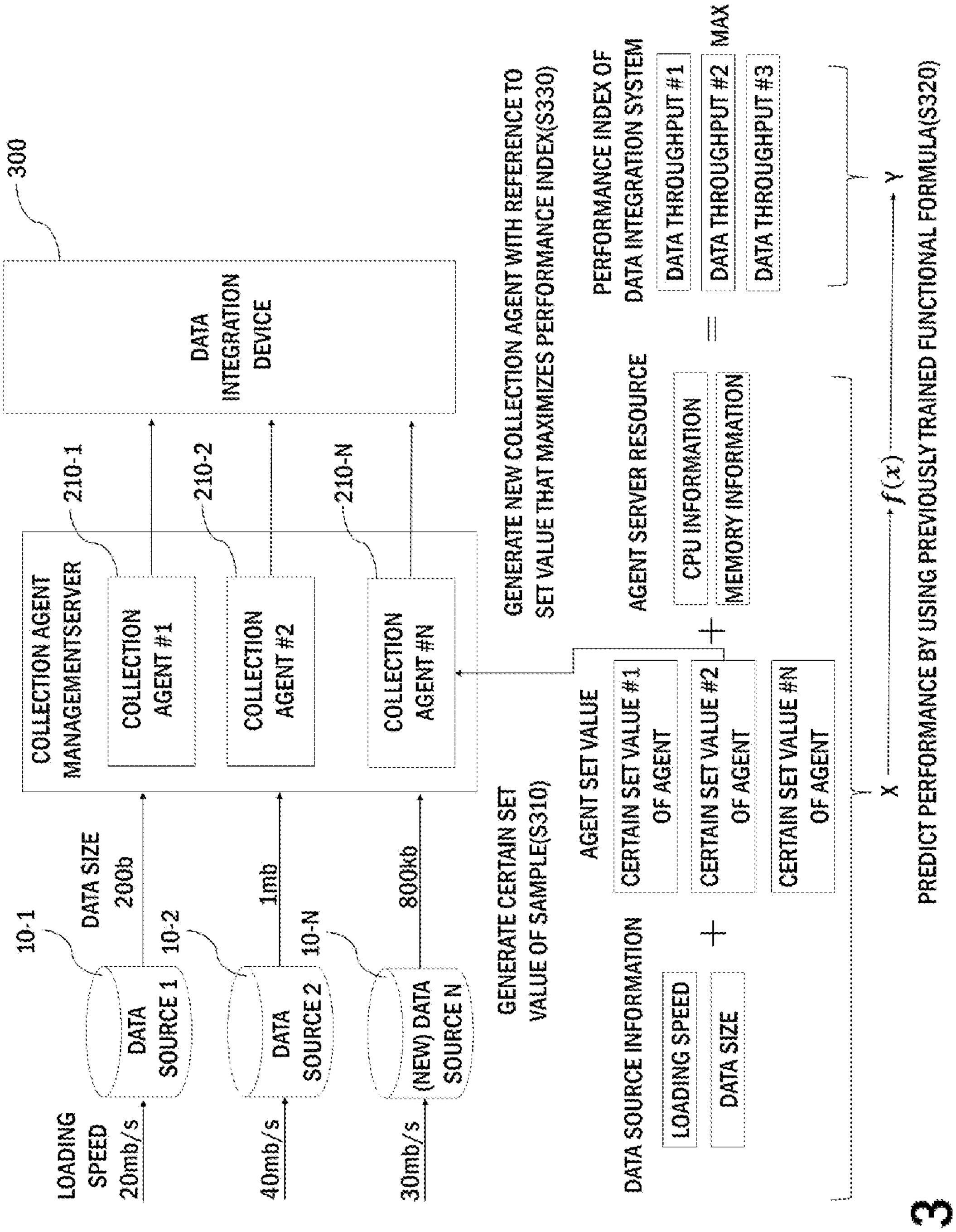
FIG. 3 is a view provided to explain a process of generating a new collection agent with reference to a set value for maximizing a performance index through the system for setting an optimal synchronization agent according to a workload according to an embodiment.

FIG. 3 is a view provided to explain a process of generating new collection agents 210-1 to 210-N with reference to a set value for maximizing a performance index through the system for setting an optimal synchronization agent according to a workload according to an embodiment.

Referring to FIG. 3, when there is no data source that is previously registered, the performance prediction module 130 may generate a plurality of certain set values for a collection agent 210-N to be generated (S310), and may input the certain set values, and may perform sampling (an operation of predicting a performance index of the data integration device 300 by applying each of the certain set values to the association relationship functional formula) and may collect data.

That is, when generating a new collection agent 210-N, the performance prediction module 130 may predict a performance index of the data integration device 300 by applying the generated plurality of certain set values to the trained association relationship functional formula (S320), and the set value recommendation module may recommend a set value that optimizes the performance index as a set value of a new collection agent 210-N to be generated.

Through this, the agent management server 200 may generate a new collection agent 210-N with reference to a set value that enables an optimal performance index to be obtained among the results of prediction (S330).

Figure 4:
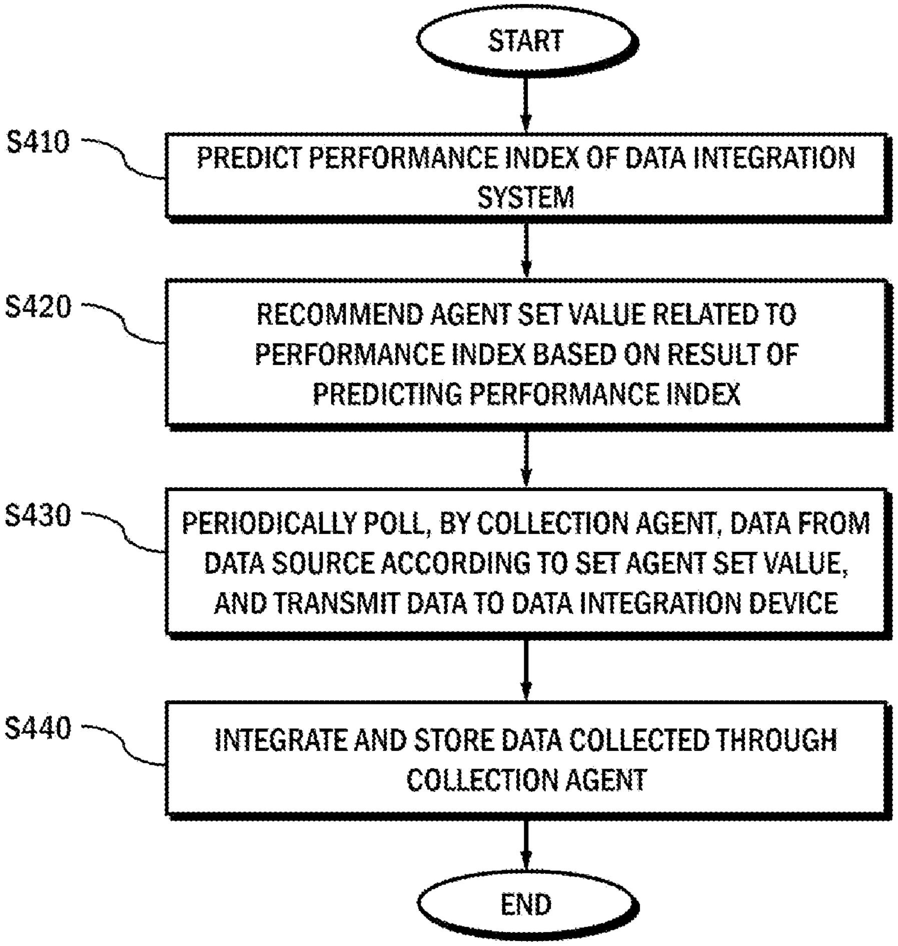
FIG. 4 is a flowchart provided to explain a method for setting an optimal synchronization agent according to a workload according to an embodiment.

FIG. 4 is a flowchart provided to explain a method for setting an optimal synchronization agent according to a workload according to an embodiment.

The method for setting an optimal synchronization agent according to a workload according to an embodiment may be executed by the system described above with reference to FIGS. 1 to 3.

Referring to FIG. 4, the method for setting an optimal synchronization agent according to a workload may predict a performance index of the data integration device 300 through the system, may recommend an agent set value related to the performance index based on the result of predicting the performance index, and may set an optimal agent set value.

Herein, the method for setting an optimal synchronization agent according to a workload may predict the performance index of the data integration device 300 by using an association relationship functional formula that is trained as described above in order to recommend an agent set value, and may recommend an agent set value based on the result of predicting the index performance.

In addition, the method for setting an optimal synchronization agent according to a workload may cause the collection agents 210-1 to 210-N to periodically poll data from the data sources 10-1 to 10-N according to the agent set value which is set through the system, and to transmit the data to the data integration device 300, and may cause the data integration device 300 to integrate data collected through the collection agents 210-1 to 210-N and to store the data.

The technical concept of the present disclosure may be applied to a computer-readable recording medium which records a computer program for performing the functions of the apparatus and the method according to the present embodiments. In addition, the technical idea according to various embodiments of the present disclosure may be implemented in the form of a computer readable code recorded on the computer-readable recording medium. The computer-readable recording medium may be any data storage device that can be read by a computer and can store data. For example, the computer-readable recording medium may be a read only memory (ROM), a random access memory (RAM), a CD-ROM, a magnetic tape, a floppy disk, an optical disk, a hard disk drive, or the like. A computer readable code or program that is stored in the computer readable recording medium may be transmitted via a network connected between computers.

In addition, while preferred embodiments of the present disclosure have been illustrated and described, the present disclosure is not limited to the above-described specific embodiments. Various changes can be made by a person skilled in the at without departing from the scope of the present disclosure claimed in claims, and also, changed embodiments should not be understood as being separate from the technical idea or prospect of the present disclosure.

What is claimed is:

1. A system for setting an optimal synchronization agent according to a workload, the system comprising:

a data integration device comprising at least a first processor and configured to integrate and store data which is collected through a collection agent;

an agent management server comprising at least a second processor and configured to manage the collection agent that periodically polls data from a data source and transmits the data to the data integration device; and an agent setting automation device comprising at least a third processor and configured to set an agent set value related to collection and transmission of data of the collection agent, wherein the agent setting automation device further comprises a performance prediction module configured to train an association relationship functional formula that is related to a performance index of the data integration device, information of the data source, a current status of resources of a CPU and a memory of the agent management server, and the agent set value of the collection agent, and to predict the performance index of the data integration device by using the trained association relationship functional formula, wherein the agent setting automation device further comprises a storage unit configured to store history data regarding performance of the collection agent, and wherein the storage unit is configured to store a data loading speed of a previously registered data source, information on a data size, the current status of resources of the CPU and the memory of the agent management server, the agent set value of the collection agent, and a performance result value of the data integration device which is derived in a corresponding environment.

2. The system of claim 1, wherein the agent setting automation device further comprises:

a user interface unit; and a set value recommendation module configured to recommend an agent set value based on a result of predicting the performance index.

3. The system of claim 2, wherein the performance prediction module is configured to periodically collect data from the storage unit from a time when the agent setting automation device is driven.

4. The system of claim 3, wherein the agent set value comprises a set value regarding a polling period, a size of a buffer memory, an arrangement size, a type of a compression algorithm, and a data waiting time.

5. The system of claim 3, wherein the performance prediction module is configured to generate a plurality of certain set values for a collection agent to be generated when there is no data source that is previously registered, and to perform sampling.

6. The system of claim 5, wherein, when the plurality of certain set values are generated, the performance prediction module is configured to predict the performance index of the data integration device by applying the generated plurality of certain set values to the trained association relationship functional formula, and wherein the set value recommendation module is configured to recommend a set value that maximizes the performance index as a set value of a new collection agent to be generated.

7. The system of claim 2, wherein the user interface unit is configured to perform an operation of at least one of generating, referring to, and deleting a collection agent, and to generate a collection agent based on a set value that is recommended by the set value recommendation module.

8. The system of claim 2, wherein the performance index of the data integration device is a data throughput of the data integration device.

9. A processor-implemented method for setting an optimal synchronization agent according to a workload, the method comprising:

training, by an agent setting automation device comprising at least one processor, an association relationship functional formula that is related to a performance index of a data integration device, information of a data source, a current status of resources of a CPU and a memory of an agent management server, and an agent set value of a collection agent;

predicting, by the agent setting automation device, the performance index of the data integration device by using the trained association relationship functional formula;

setting, by the agent setting automation device, an agent set value related to collection and transmission of data of the collection agent based on a result of predicting the performance index;

periodically polling, by the collection agent, data from a data source according to the set agent set value, and transmitting the data to a data integration device; and integrating, by the data integration device, data collected through the collection agent, and storing the data.

10. The method of claim 9, wherein the agent setting automation device comprises:

a user interface unit;

a storage unit configured to store history data regarding performance of the collection agent; and a set value recommendation module configured to recommend an agent set value based on a result of predicting the performance index.

11. The method of claim 10, further comprising periodically collecting, by the performance prediction module, data from the storage unit from a time when the agent setting automation device is driven.

12. The method of claim 11, wherein the agent set value comprises a set value regarding a polling period, a size of a buffer memory, an arrangement size, a type of a compression algorithm, and a data waiting time.

13. The method of claim 11, further comprising generating, by the performance prediction module, a plurality of certain set values for a collection agent to be generated when there is no data source that is previously registered, and performing sampling.

14. The method of claim 13, further comprising, when the plurality of certain set values are generated, predicting, by the performance prediction module, the performance index of the data integration device by applying the generated plurality of certain set values to the trained association relationship functional formula, and recommending, by the set value recommendation module, a set value that maximizes the performance index as a set value of a new collection agent to be generated.

15. The method of claim 10, further comprising performing, by the user interface unit, an operation of at least one of generating, referring to, and deleting a collection agent, and generating a collection agent based on a set value that is recommended by the set value recommendation module.

16. The method of claim 10, wherein the performance index of the data integration device is a data throughput of the data integration device.

17. A system for setting an optimal synchronization agent according to a workload, the system comprising:

a data integration device comprising at least a first processor and configured to integrate and store data which is collected through a collection agent, the collection agent configured to periodically poll data from a data source and transmit the data to the data integration device; and an agent setting automation device comprising at least a second processor and configured to train an association relationship functional formula that is related to a performance index of the data integration device, information of the data source, a current status of resources of a CPU and a memory of an agent management server, and an agent set value of the collection agent, to predict the performance index of the data integration device by using the trained association relationship functional formula, to recommend an agent set value related to the performance index based on a result of predicting the performance index, and to set an agent set value.

* * * * *